July 20, 1926.
A. J. JOHNS
1,593,126
ATTACHMENT FOR PLOWS
Filed March 19, 1925
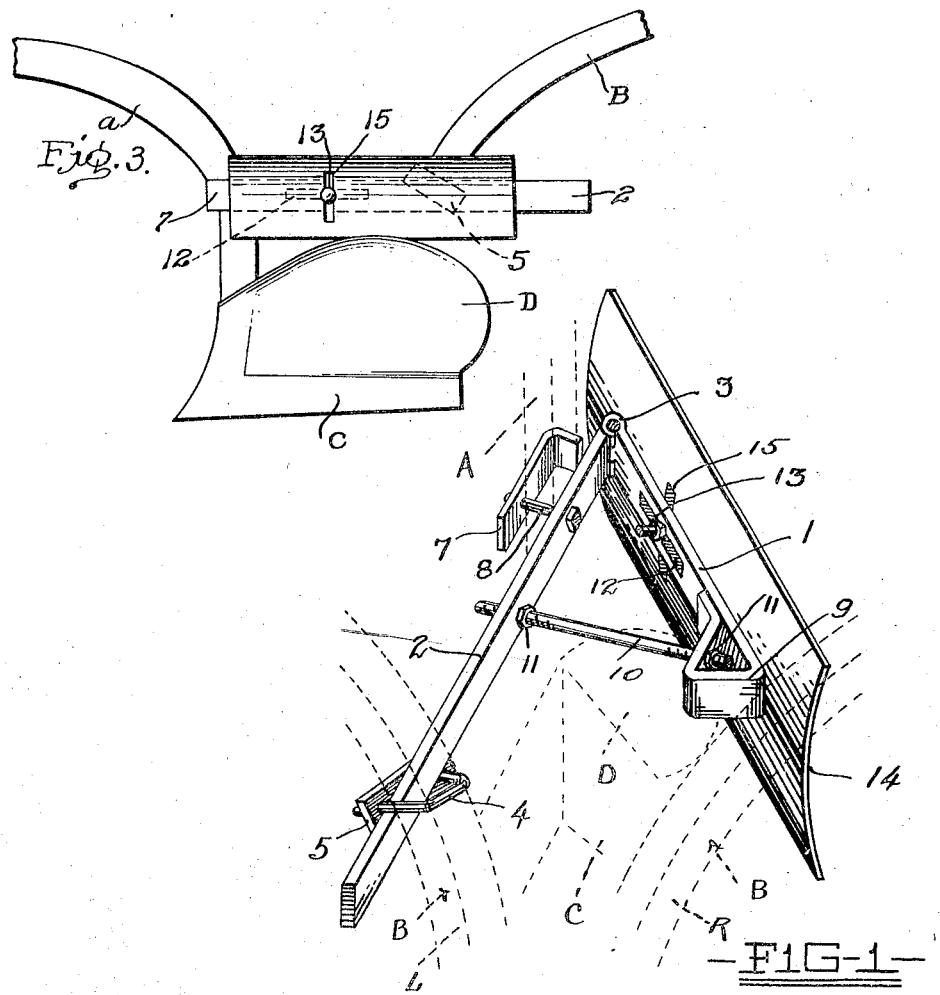
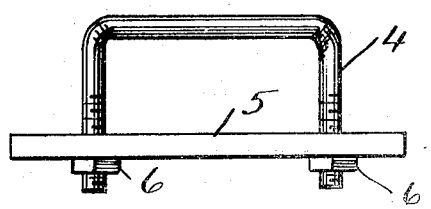
Inventor
ANDREW J. JOHNS.
By *Werner J. Cutterley*
Attorney Patented July 20, 1926.

1,593,126

UNITED STATES PATENT OFFICE.

ANDREW J. JOHNS, OF CLEVELAND, FLORIDA.

ATTACHMENT FOR PLOWS.

Application filed March 19, 1925. Serial No. 16,698.

My invention has reference, in its broad aspect, to improvements in adjustable and detachable plates for plows of the type designed to prevent choking of the plow and to facilitate its operation in fields having an unusually tall, dense and heavy covering or growth of weeds, underbrush and the like; and more particularly my invention is designed to provide a weed turner or glider plate of this type which may be used with reversible or "hill" plows and which may be readily adjusted to fit plows of different sizes, and capable of detachment with facility from any plow when it is not desired to use the same.

Briefly stated, some of the important objects of my invention are as follows; first, to provide an adjustable supporting frame for my plate which may be regulated for proper attachment to different types and sizes of plows; second, to provide means for adjustably attaching the plate to the supporting frame so that it may be properly positioned with respect to the mold board of a plow or with respect to the growth to be plowed under; third, to provide adjustable securing devices for the supporting frame so that the same may be properly attached to a plow irrespective of the size, shape or arrangement of the post and handles of the plow, and; fourth, to attain the above and other ends in the simplest and most effective manner whereby to provide a practical device having relatively few parts, and which is not apt to become out of order or broken through hard and continuous usage.

The structural elements employed to accomplish the above and other results and objects will be hereinafter more fully described in detail and defined in the claims appended hereunto and forming a part of this specification.

In the accompanying drawings wherein is illustrated the preferred embodiment of my invention:—

Figure 1 is a perspective view of my device, the plow being indicated conventionally by dotted lines.

Figure 2 is a detail view of one of my attaching devices, and

Figure 3 is a side view of my device mounted on a plow, and shows the manner in which it functions.

In the drawings wherein like characters of reference designate like or similar parts throughout the several views:—

The plow post, plow handles, plow, and mold board are conventionally shown by dotted lines and are designated respectively by the letters A, B, C and D. In Figure 1, which is a view looking forwardly of the plow, the left hand and right hand handles are designated respectively by letters L and R, and will be hereinafter referred to by such designation.

My attachment is formed with a supporting frame having hingedly connected side members (1) and (2), the member (2) being longer than the member (1), and the hinged connection (3) therebetween being formed by bends in the structure of their respective meeting ends coupled by the usual pin. The member (2) which is the longest of the two is attached normally, and in the present instance, to the left hand handle L of the plow by a U-bolt (4), the ends of which U-bolt carry a locking plate (5) held in place by nuts (6). The member (2) is attached to the plow post A by an angle iron (7) which is secured by bolt (8). The member (1) which is the shortest of the two has its free end turned upon itself as at (9) to form an angular head which is engaged by a bolt (10). The bolt (10) also engages the member (2) and by manipulating the nuts (11) of the bolt (10) the proper angular relationship between members (1) and (2) may be attained. The member (1) is not attached to the right hand handle R but should lie approximately along a line contemplated between the handle R and plow post A, and above the mold board D.

Formed intermediate the ends of member (1) is a longitudinal slot (12) through which extends a bolt (13). My curved plate (14) is provided with a vertical slot (15) through which the bolt (13) extends to attach the plate to the member (1). Manifestly the plate may be adjusted either horizontally or vertically by means of properly positioning the bolt (13) in the respective slots, and the plate is disposed normally with its concave surface facing outwardly from the plow. The plate should also be positioned just above the mold board D of the plow so that it will engage any tall weeds or other growth through which the plow is drawn to turn the same and prevent choking or clogging of the plow.

It is believed that the operation of my plow attachment will be manifest from the foregoing, but attention is here particularly directed to the fact that my attachment is not only plurally adjustable, but is exceedingly simple in construction and effective in operation.

While in the foregoing there has been illustrated and described such combination and arrangement of elements as constitute the preferred embodiment of my plow attachment, it is nevertheless desired to emphasize the fact that interpretation of the invention should only be conclusive when made in the light of the subjoined claims:

Having described my plow attachment and its objects with such attention to detail as will thoroughly acquaint one skilled in the art with its construction and advantages, I claim:—

1. An attachment for plows comprising a plate, a supporting frame for the plate formed with side members hingedly connected at one of their ends, and one of which carries the plate, an L-shaped bracket member carried by the other side member for attaching the frame to the post of a plow, a U-shaped bracket member carried by said last named side member for attaching the same to one of the handles of a plow, and an adjusting member connected to both of said side members for regulating the angular disposition of said side members with respect to each other.

2. An attachment for plows comprising a plate, an angular supporting frame for the plate formed with side members hingedly connected to each other at one of their ends and one of which carries the plate, said last mentioned side member, and said plate, each being slotted, and a bolt passing through said slots for adjustably mounting the plate on the side member, and an adjusting bolt connecting the two side members for regulating their relative angular disposition.

3. An attachment for plows comprising a plate, a supporting frame for the plate, a bracket carried by said frame for attaching the same to the post of a plow, a second bracket also carried by the frame and freely movable thereon for attaching the frame to one handle of a plow, said frame being formed with side members adjustably connected together at one of their ends, one side member having its remaining end bent over and upon itself to form a head, and a bolt extending from the head to the other side member for adjusting the position of one side member with respect to the other for the purpose defined.

In testimony whereof, I affix my signature hereunto.

ANDREW J. JOHNS.